US 9,485,685 B2

(12) United States Patent
Miklós et al.

(10) Patent No.: US 9,485,685 B2
(45) Date of Patent: Nov. 1, 2016

(54) CONGESTION MONITORING OF MOBILE ENTITIES

(71) Applicant: Telefonaktiebolaget L M Ericsson (publ), Stockholm (SE)

(72) Inventors: György Miklós, Pilisborosjenö (HU); Maria Belen Pancorbo Marcos, Madrid (ES); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 14/303,792

(22) Filed: Jun. 13, 2014

(65) Prior Publication Data

US 2015/0365843 A1     Dec. 17, 2015

(51) Int. Cl.
*H04W 28/02*    (2009.01)
*H04W 24/02*    (2009.01)
(Continued)

(52) U.S. Cl.
CPC ......... *H04W 28/0289* (2013.01); *H04W 28/12* (2013.01); *H04L 47/14* (2013.01); *H04L 47/29* (2013.01)

(58) Field of Classification Search
CPC ... H04W 16/00; H04W 24/00; H04W 24/02; H04W 24/08; H04W 28/02; H04W 28/0226; H04W 28/0242; H04W 28/0247; H04W 28/0284; H04W 28/0289; H04W 36/16; H04W 36/22; H04W 48/00; H04W 88/184
See application file for complete search history.

(56) References Cited

U.S. PATENT DOCUMENTS

2010/0287121 A1*  11/2010  Li ................. G06Q 30/0283
                                                    705/400
2011/0158090 A1*  6/2011  Riley .................. H04L 12/14
                                                    370/230
(Continued)

FOREIGN PATENT DOCUMENTS

EP         2512176 A1    10/2012

OTHER PUBLICATIONS

3GPP, "3rd Generation Partnership Project; Technical Specification Group Services and System Aspects; Architecture enhancements for non-3GPP accesses (Release 12)", 3GPP TS 23.402 V12.4.0, Mar. 2014, 1-288.

(Continued)

*Primary Examiner* — Ahmed Elallam
(74) *Attorney, Agent, or Firm* — Murphy, Bilak & Homiller, PLLC

(57) ABSTRACT

A method, by a policy control unit of a mobile communications network, to control a signaling of congestion information of mobile entities at a plurality of congestion monitoring units that monitor which mobile entities are affected by a congestion state in a radio access network of the mobile communications network. The method comprises receiving, from one of the congestion monitoring units, an indication that one of the mobile entities is affected by a congestion state, storing said one congestion monitoring unit from which the indication is received as the current congestion monitoring unit for said one mobile entity, receiving, from another congestion monitoring unit, the indication that said one mobile entity is affected by a congestion state, and indicating, in response to the indication received from the other monitoring unit, to the current congestion monitoring unit a release of congestion information relating to said one mobile entity.

18 Claims, 6 Drawing Sheets

(51) Int. Cl.
    *H04L 12/26*     (2006.01)
    *H04L 12/813*     (2013.01)
    *H04W 28/12*     (2009.01)
    *H04L 12/801*     (2013.01)

(56) References Cited

U.S. PATENT DOCUMENTS

| | | | | |
|---|---|---|---|---|
| 2012/0052866 | A1* | 3/2012 | Froehlich | H04L 47/14 455/445 |
| 2012/0257499 | A1* | 10/2012 | Chatterjee | H04W 28/0284 370/232 |
| 2014/0198637 | A1* | 7/2014 | Shan | H04W 52/243 370/229 |
| 2014/0355428 | A1* | 12/2014 | Smith | H04W 48/06 370/230 |
| 2015/0036496 | A1* | 2/2015 | Shan | H04W 88/06 370/235 |
| 2015/0103664 | A1* | 4/2015 | Shan | H04W 24/10 370/235 |
| 2015/0201352 | A1* | 7/2015 | Shan | H04W 52/243 370/235 |
| 2015/0382230 | A1* | 12/2015 | Miklos | H04W 28/0247 370/230 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.4.0, Mar. 2014, 1-299.

3GPP, "3rd Generation Partnership Project; Technical Specification Group Services and System Aspects; Study on system enhancements for user plane congestion management (Release 13)", 3GPP TR 23.705 V0.10.0, Apr. 2014, 1-63.

Gundavelli, et al., "Proxy Mobile IPv6", Network Working Group, Request for Comments 5213, Standards Track, Aug. 2008, 1-92.

3GPP, "3rd Generation Partnership Project; Technical Specification Group Services and System Aspects; Study on system enhancements for user plane congestion management (Release 13)", 3GPP TR 23. 705 V0.11.0, May 2014, 1-64.

Unknown, Author, "Integrated On-path/Off-path Congestion/Abatement Awareness Notification", KDDI et al., SA WG2 Meeting S2#99, S2-133272, Xiamen, China, Sep. 2013, 1-6.

\* cited by examiner

CONGESTION MONITORING OF MOBILE ENTITIES

TECHNICAL FIELD

The present invention relates to a method, by a policy control unit of a mobile communications network, to control a signaling of congestion information of mobile entities and to the corresponding policy control unit. The invention furthermore relates to a method of operating a congestion monitoring unit which monitors which mobile entities are affected by a congestion state in a radio access network of a mobile communications network and to the corresponding congestion monitoring unit. The invention furthermore relates to a computer program, to a computer program product and to a corresponding carrier containing the computer program.

BACKGROUND

Packet data traffic is growing very quickly in mobile communications networks or mobile operator networks, in many cases it grows much faster than the rate at which the operator can expand its network capacity. This leads to more frequent occurrences of network congestion when the offered traffic is higher than what the RAN (radio access network) is able to fulfill. Also, new services appear often, which may lead to a situation when a new QoE (Quality of Experience) requirement has to be introduced into the network quickly. In this situation, operators need efficient and flexible tools by which they can control how the bottleneck RAN capacity can be best shared so that they can maximize the Quality of Experience of their users.

Recently, in the context of the 3GPP UPCON (User plane congestion management) work item, a new type of solution has been put forward which utilizes congestion feedback from the CN (Core Network) to the RAN. This has been documented in 3GPP TR 23.705 version 0.10.0. When RAN indicates congestion to the CN, it can take actions to mitigate the congestion, such as limiting some classes of traffic, or request to delay some other classes of traffic.

The RAN OAM (Operation and Maintenance) systems contain a lot of information based on which an operator may derive when a state of congestion takes place. Such information can include for example data about the amount of packet loss, packet delay, traffic throughput, air interface utilization, number of connected users, number of connected users with non-empty buffers, etc. A mobile network operator may configure thresholds on one or on a combination of these metrics to determine when a state of congestion is considered in its network. It is also possible for a mobile operator to define multiple levels of congestion using the combination of these metrics, so that the congestion mitigation actions can correspond to the current level of congestion.

Current RAN OAM systems work on a per cell or lower spatial granularity. That means that the determination of congestion could be performed on a per cell basis, or for a group of cells (such as cells belonging to the same eNB (eNode B) for LTE (Long Term Evolution), or cells belonging to the same Service Area for 3G). In order for the core network to take appropriate mitigation action, the core network also has to find out which UEs (User Equipments/mobile entities) are located in a given cell. Hence, the list of affected UEs needs to be determined for the cells which are considered congested based on OAM data.

One solution for OAM based congestion reporting is documented in solution 1.5.5 (also called off-path solution) in section 6.1.5.5 of 3GPP TR 23.705, which suggests a new interface Nq for this purpose. The Nq interface is defined between a new network entity RCAF (RAN Congestion Awareness Function) and the MME (Mobility Management Entity). The RCAF is the node which is assumed to receive RAN congestion related data from the RAN OAM system on a per cell (or lower) spatial granularity. Then, using the Nq interface, the RCAF queries the MME to supply the list of UEs per cell.

A similar approach is suggested for the 3G case, using Nq' interface from the RCAF to the SGSN (Serving GPRS Support Node). However, there is a difference for 3G since the RAN can already have the UE identities, as the IMSI (International Mobile Subscriber Identity) can be sent to the RNC (Radio Network Controller) node. The RAN OAM collects these IMSIs and RAN OAM then supplies the list of UEs identified by IMSI that affected by congestion to the RCAF. Hence, for 3G it is suggested that the list of UEs affected by congestion are known to the RCAF without contacting the SGSN over the Nq' interface.

Once the RCAF node has collected information about the set of UEs affected by congestion, it notifies the PCRF (Policy and Charging Rules Function) about the congestion level of the affected UEs (identified by a UE identifier such as the IMSI (International Mobile Subscriber Identity)). The Np interface is defined between the RCAF and the PCRF for this purpose. As described in TR 23.705, the PCRF can then take actions to mitigate the congestion e.g., by limiting the traffic in an enforcement node (PGW or TDF) (Packed Gateway or Traffic Detection Function), or notifying the application function (AF) to limit or delay the traffic, etc.

One problem with the congestion notifications from the RCAF to the PCRF is the handling of the UE mobility. There may be multiple RCAF nodes in a network, each corresponding to a certain geographical area. It may also be possible that a given RCAF handles a single RAT (radio access technology) type only, such as LTE only or 3G only, and the UE may move between the RATs. As a result of UE mobility between different RCAFs, the PCRF may receive notifications from multiple RCAFs for a given UE, and it may not be always possible to know which is the latest information.

This is complicated by additional factors. Firstly, the RCAF may get periodic information about UEs on a longer time-scale, such as 15 mins, and consequently the RCAF may perform the reporting to the PCRF only after some delay. Different RCAFs are not synchronized, so it may happen that when the UE moves from RCAF1 to RCAF2, the reporting from RCAF2 takes place earlier than from RCAF1. Hence the ordering of the incoming congestion notifications at the PCRF may not reflect the ordering of UE mobility events.

Secondly, the RCAF may only know about a given UE if it is affected by congestion. For a UE that is not affected by congestion, the RCAF may not get information for that given UE via OAM or via Nq. Therefore it may happen that the UE moves from RCAF1 to RCAF2, the UE is affected by congestion at RCAF1 but not affected by congestion at RCAF2 hence RCAF2 does not produce any congestion indication to the PCRF. This may lead to the PCRF incorrectly believe that the UE experiences congestion at RCAF1.

One additional aspect to consider in the solution of these problems is that the signaling load on the Np interface between the RCAF and the PCRF may be significant. There may be a high number of UEs in a network, and it is possible that the congestion state changes for a substantial fraction of the UEs. Hence it is desirable to limit the signaling load on the Np interface.

The following solution approaches for UE mobility handling have been suggested.

Approach 1. In 3GPP TR 23.705 version 0.10.0, a validity time is associated with the information sent from the RCAF to the PCRF on the Np interface. It is stated that "When this time has elapsed and no further congestion information has been received, the congestion is assumed to be over." Such a validity time can be used in the PCRF to prevent that the PCRF permanently assumes the UE to be affected by congestion while it has moved to another RCAF where it is not affected by congestion.

Approach 2. In protocols handling mobility, it is common to use timestamps to signal the ordering of the events in the receiving node. E.g., timestamps can be used as one of the options in the PMIPv6 mobility protocol (RFC 5213 from August 2008).

Approach 3. In protocols handling mobility, it is also common to use sequence numbers to signal the ordering of the events in the receiving node. E.g., sequence numbers can be used as one of the options in the PMIPv6 mobility protocol (RFC 5213).

Approach 4. Intra-LTE TAU (Tracking Area Update) and Inter-eNodeB Handover with Serving GW (Gateway, SGW) Relocation procedure with PMIP (Proxy Mobile IP)-based S5 interface is defined in 3GPP TS 23.402 version 12.4.0, section 5.7.1. That procedure includes the Gxc session (i.e., GW control session) moved from an old SGW to a new SGW. That Gxc session is terminated in the PCRF, in that way the scenario is similar to mobility handling at the Np interface since the endpoint is the PCRF.

Approach 5. In signaling procedures between the MME and the HSS (Home Subscriber Server) for mobility (see e.g., 3GPP TR 23.401 version 12.4.0, section 5.3.3.1 describing the TAU procedure), the HSS sends a Cancel location to the old MME when it receives a mobility update (Update location) from a new MME. This is used to release some of the context information in the old MME.

The following problems are seen with the existing solutions described above.

Approach 1. Using a validity time would be useful if the congestion ends just when the validity time expires. However, if the congestion ends at some other time compared to when the validity timer expires, this approach does not perform well. In case the congestion ends sooner than the validity timer expires, we maintain CN throttling actions unnecessarily, degrading the end user performance. In case the congestion ends later than the validity timer expires, new signaling is necessary to maintain the CN action, which can lead to excessive and unnecessary signaling. Given that the length of the congestion period cannot be accurately predicted in advance, these issues are expected degrade the performance of this solution.

Note also that the congestion status may change between different levels, and those changes are not handled by validity timers which only consider the transition to no congestion state. Hence, the gain potential of the validity timer approach is very limited, and the risk of performance loss is higher.

An additional problem with validity timer based approach is that the PCRF may receive congestion information from more than one RCAF nodes and it is possible that there are multiple such congestion information whose validity timer has not yet expired. In that case, it is problematic for the PCRF to determine which is the actual congestion level. Some heuristics need to be used (use the average; or maximum; or use the latest received information), but such heuristics might not be efficient.

Note also that the use of validity time impacts the PCRF since the PCRF node is otherwise not timer-based.

Approach 2. The use of timestamps in our case is problematic. On the one hand, there is no timing synchronization between the RCAF nodes. But even if we could use sufficiently accurate timing information, it would not be sufficient, due to the long and unpredictable delay in the OAM based data reporting. As noted earlier, it is possible that the UE moves from RCAF1 to RCAF2, yet the congestion information reporting takes place from the RCAF2 earlier than from RCAF1. As the RCAF uses long time-scale OAM reporting (such as reporting on a 15 mins period), the RCAF has no way to determine the whereabouts of a UE on a shorter time scale. So the time ordering of the signaling messages from RCAF nodes to PCRF is not sufficient to determine the ordering of UE mobility events.

Approach 3. Sequence numbering is not applicable in our case, because there is no way to transfer sequence number state from RCAF1 to RCAF2. That is because each RCAF acts on its own, and a RCAF has no way to determine which was the previous RCAF in case of mobility, or which will be the next RCAF in case the UE moves. Hence it is not possible to establish any communication between RCAF1 and RCAF2 to transfer state information for the current sequence numbering.

Approach 4. The solution for Approach 4 involves the explicit establishment of a new Gxc session between the new SGW and PCRF, and the explicit release of the old Gxc session between the old SGW and PCRF. The procedure guarantees that the establishment of the new session always takes place, and the release of the old session also always takes place. This is possible since the procedure involves explicit context transfer from an old MME to a new MME which in turn control the establishment and release of the sessions between the SGWs and the PCRF. (If the MME does not change, the same MME can control the session establishment and release between the SGWs and the PCRF.) This approach is not applicable in our case because there is no context transfer or single node which can control both the RCAF1 and RCAF2 at mobility. Further, in our case a new RCAF may not detect a UE if it is not experiencing congestion, so it cannot make sure that a new session to the PCRF is always established.

Approach 5. In existing mobility procedures between the MME and the HSS, the HSS sends a Cancel location message to the old MME unconditionally. That is possible since there is a context transfer between the new and old MME which guarantees that an indication from the new MME is always sent to the HSS. In our case, such a message to release the old context from the PCRF to the old RCAF cannot be always sent, because there is no guarantee that the new RCAF will signal to the PCRF. Furthermore, it is not possible to send such a message unconditionally, because it is possible that an RCAF node indicates to the PCRF about change to the no congestion state.

SUMMARY

Accordingly, a need exists to overcome at least some of the above-mentioned problems and to provide a possibility to provide correct congestion information for a mobile entity in an effective way, while minimizing a signal exchange between the affected nodes in the network.

This need is met by the features of the independent claims. The dependent claims describe further embodiments.

According to a first aspect, a method is provided, carried out by a policy control unit of a mobile communications network to control a signaling of congestion information of mobile entities at a plurality of congestion monitoring units which monitor which mobile entities are affected by a congestion state in a radio access network of the mobile communications network. The method comprises the steps of receiving, from one of the congestion monitoring units, a first indication that one of the mobile entities is affected by a congestion state. Said one congestion monitoring unit from which the first indication is received is stored as the current congestion monitoring unit for said one mobile entity. Furthermore, the first indication is received from another congestion monitoring unit that said one mobile entity is affected by a congestion state. In response to the first indication received from the other monitoring unit, it is indicated to the current congestion monitoring unit to release congestion information relating to said one mobile entity. In other word, the policy control unit indicates to the current congestion monitoring unit to stop congestion reporting relating to said mobile entity.

The invention furthermore relates to the corresponding policy control node which operates as discussed above and controls a signaling for congestion information at a plurality of congestion monitoring units. The policy control unit comprises a receiver configured to receive from one of the congestion monitoring units a first indication that one of the mobile entities is affected by a congestion state. A database is provided which is configured to store said one congestion monitoring unit from which the first indication is received as the current congestion monitoring unit for said one mobile entity. Furthermore, the policy control unit comprises a transmitter and a processing unit wherein, when the receiver receives the first indication that said one mobile entity is affected by a congestion state from another congestion monitoring unit, the processing unit is adapted to indicate by the transmitter, to the current congestion monitoring unit to release congestion information relating to the one mobile entity in response to the received first indication.

The policy control unit can work as described above and the policy control unit may be a PCRF.

The invention furthermore relates to a method to operate a congestion monitoring unit which monitors which mobile entities are affected by a congestion state in a radio access network of a mobile communications network. The congestion monitoring unit receives, from a policy control unit of the mobile communications network, an indication to release congestion information relating to said one mobile entity. The congestion monitoring unit then releases the congestion information for said one mobile entity in response to the received indication. The invention furthermore relates to the corresponding congestion monitoring unit. Furthermore, the invention provides a computer program comprising instructions which, when executed on at least one processing unit, cause the processing unit of the congestion monitoring unit or the policy control unit to carry out the method as described above. The invention furthermore provides a computer program product comprising the computer program and a carrier containing the computer program.

BRIEF DESCRIPTION OF THE DRAWINGS

The above and other objects, features and advantages of the present invention will become apparent from the following description of embodiments given in conjunction with the accompanying drawings.

DETAILED DESCRIPTION

Figure 1:
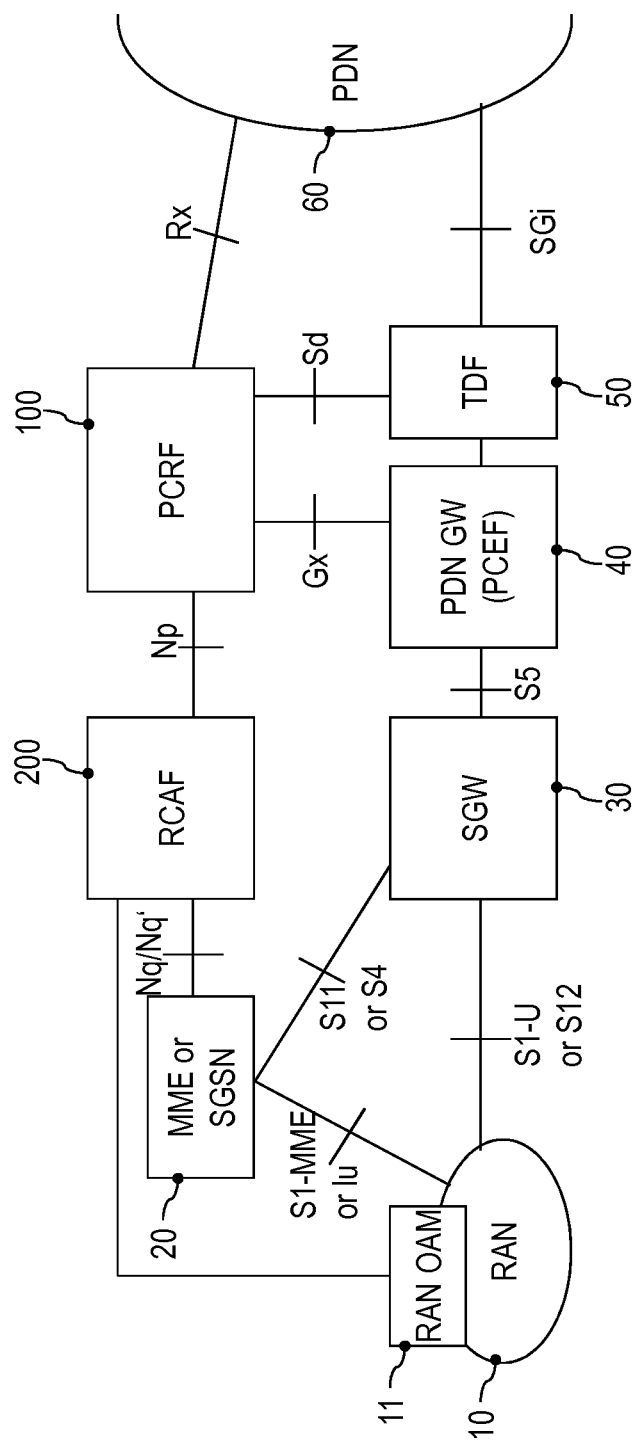
FIG. 1 shows a system architecture incorporating features of the invention including a congestion monitoring unit and a policy control unit which interact to effectively signal congestion information.

In the following, concepts according to embodiments of the invention will be explained in more detail by referring to the accompanying drawings.

A policy control unit stores the last congestion monitoring unit for each mobile entity and if a congestion state is received from a new congestion monitoring unit for one mobile entity, the old congestion monitoring unit is informed to stop congestion reporting for said one mobile entity.

This means that the congestion monitoring unit reports the changes in the congestion state and the policy control unit maintains the current congestion monitoring unit which has last indicated that the mobile entity is affected by a congestion. An explicit signaling is used in which the policy control unit informs the current congestion monitoring unit, which is then an old congestion monitoring unit, as the first indication is then received from another congestion monitoring unit, to release the congestion information stored at the current congestion monitoring unit. This especially helps to avoid errors occurring with congestion information stored at old congestion monitoring units. Especially when the mobile entity moves from the responsibility of one congestion monitoring unit to another congestion monitoring unit, the above discussed method provides advantages. The policy control unit then indicates to stop the congestion reporting until said one mobile entity becomes affected by a congested state once again. The policy control unit maintains the current congestion monitoring unit which has last indicated that the mobile entity is affected by a congestion and when a new or another congestion monitoring unit indicates that the mobile entity is affected by congestion, the policy control unit informs the currently stored congestion monitoring unit to explicitly release any information relating to said one mobile entity.

It is possible that a second indication is received from any of the plurality of congestion monitoring unit that said one mobile entity is not affected by a congestion state. In this situation, the second indication is then ignored and no indication is sent to the current congestion monitoring unit to release congestion information for said one mobile entity.

The policy control unit does not take into account this second indication. The current congestion monitoring unit remains unchanged. The policy control unit assumes the previously determined congestion status without updating it to a non-congestion state. This ignoring of the policy control unit helps especially to improve the situation when a mobile entity has moved from the responsibility area of one congestion monitoring unit to the area of another congestion monitoring unit. If the first congestion monitoring unit then indicates a non-congested state, even though it does not know whether a congested state is present at the other congestion monitoring unit in the area where the mobile entity is now located. The fact that the policy control unit ignores the second indication of a non-congested state helps to avoid the policy control unit to take over a wrong congestion state. The current congestion state may be kept as the current congestion state when the second indication is received in which any of the congestion monitoring units indicated that the mobile entity is currently not affected by a congestion state, i.e. is in a non-congested state.

The policy control unit may furthermore store the other congestion monitoring unit from which the first indication is received that the mobile entity is affected by a congestion state. This means that when an information about a congested state for one mobile entity is received from a congestion monitoring unit, this congestion monitoring unit is then stored as the current congestion monitoring unit for said mobile entity. However, as mentioned above, when in indication about a non-congested is received from one of the congestion monitoring units, this congestion monitoring unit is not stored as the current congestion monitoring unit.

Furthermore, it is possible that when a termination of a data packet session of said mobile entity is detected, it is indicated to the current congestion monitoring unit to release congestion information relating to said mobile entity. By way of example, when the policy control unit removes its own congestion information at the termination of a data packet session, e.g. the mobile entity is being detached, then the policy control unit explicitly signals to the current congestion monitoring unit to release the congestion information relating to said one mobile entity.

The step of indicating a release of congestion information can contain information to release a context for the one mobile entity.

When the second indication is received by the policy control unit indicating that said mobile entity is not affected by a congestion state, an acknowledgement can be transmitted as a response to the corresponding congestion monitoring unit which transmitted the second indication. Even though the policy control unit does not react to this information about the non-congested state, nevertheless an acknowledgement is transmitted back as a response. This helps to avoid the situation that, if no acknowledgement were sent that the second indication about the non-congested state, the second indication is sent several times as the congestion monitoring unit may deduce from a missing acknowledgement that the indication was not correctly received and that the indication is to be transmitted a second time.

Furthermore, the plurality of congestion monitoring units may be informed whether or not a monitoring of the congestion state should be carried out for said one mobile entity. Here, the policy control unit can determine whether the monitoring of a congestion state should be enabled or disabled. When the reporting of the congestion state is enabled, the policy control unit can furthermore inform the plurality of congestion monitoring units that the congestion state should only be reported to the policy control unit when the congestion state has reached a pre-defined level or a pre-defined level range. In this embodiment, the policy control unit can implement reporting restrictions in the congestion monitoring units and the congestion monitoring unit carries out the monitoring of a congestion state in accordance with the above received information, i.e. it may only report a congested state when a pre-defined level of congestion or a pre-defined level range of congestion is detected. If the mobile entity is not above the predefined level or within the predefined level range, a non-congested state may be followed in which the congestion monitoring unit issues a second indication indicating a non-congested state.

FIG. 1 shows an architecture in which a congestion monitoring unit such as a RCAF 200 (RAN congestion awareness function) determines congestion states of mobile entities (not shown) in a radio access network 10. The RCAF 200 is able to determine a RAN user plan congestion which occurs when the demand for RAN resources exceeds the available RAN capacity to deliver user data for a period of time. RAN user plan congestion leads inter alia to packet drops or delays. The RCAF 200 collects inter alia the ongoing RAN user plane performance status at cell level from the RAN OAM (Operation and Maintenance) unit 11 which is further assembled prior to reporting it to a policy control unit such as a Policy and Charging Rules Function (PCRF) 100. For the communication of congestion information between RCAF 200 and PCRF 100, an Np interface is provided.

The RCAF 200 is furthermore connected via an Nq/Nq' interface to MME or SGSN 20. The user plane data, the congestion of which is monitored, is transmitted from RAN 10 via a serving gateway, SGW 30, which rules and forwards user data packets to a PDN (Packet Data Network) gateway 40. From the PDN gateway 40, the user data are transmitted via a traffic detection function (TDF) 50 to the packet data network, PDN 60.

The following description focuses on RCAF 200 or a quantity of RCAF 200 and PCRF 100 and the interacting between these entities as the main aspects of the invention are related to these functional entities.

The following principles are used by the RCAF 200 and the PCRF 100 to optimize the monitoring of congestion information of mobile entities, especially when a mobile entity moves from an area in which one RCAF determines the congestion state of the radio access network to another RCAF which determines the congestion state of the mobile entities in another area. In the embodiment of FIG. 1, one RCAF 200 is shown. However, it should be understood that different RCAFs 200 are provided in the mobile communications network which is partly shown in FIG. 1. The RCAF 200 uses the information provided by the RAN OAM 11 such as the amount of data packet loss, packet delay, traffic throughput, air interface utilization or number of connected users and can then determine, based on configurable thresholds, a congestion state of a certain area. The RCAF 200 determines the mobile entities affected by a congestion state in an RAN area using information provided by MME or by SGSN 20.

The following principles are used by the RCAF 200 and the PCRF 100 to determine directly whether a mobile entity is affected by a congestion state or not.

The RCAF 200 reports the changes in the congestion state including both changes to a congestion state and changes to a non-congested state.

The PCRF 100 maintains the current RCAF which has last indicated that a mobile entity is affected by congestion.

When a new or another RCAF 200 indicates that the mobile entity is affected by congestion, the PCRF 100 sends a message to the old RCAF to explicitly release congestion information relating to said mobile entity, i.e. to release a context at the old RCAF.

When the PCRF 100 receives a message from a new RCAF 200, which could be any of the RCAFs, indicating that the mobile entity is not affected by congestion, this message is not taken into account at the PCRF 100.

When the PCRF 100 removes its own UE context at IP-CAN session termination, e.g. the UE is being detached, the PCRF 100 explicitly signals to the current RCAF 200 to release the UE context.

The RCAF 200, when indicated by PCRF signaling, then releases the context of the mobile entity.

In the following, based on examples, it will be explained why the above-mentioned principles help to improve the correct detection of a congestion state of a mobile entity.

The RCAF 200 gets information about the congested cells and the UEs affected by congestion based on OAM data and with the help of the Nq interface. When a UE is not affected by congestion, the RCAF nodes do not have any information about the given UE. Therefore when the RCAF 200 detects that a given UE which was earlier affected by congestion is no longer affected by congestion, the RCAF 200 node itself cannot determine whether this is because the UE has moved to another RCAF, or this is because the congestion has ceased at the UE's current location. The RCAF 200 may indicate to the PCRF that a UE does not experience congestion at the given RCAF, but this does not rule out the possibility that another RCAF may indicate that the same UE is affected by congestion.

Similarly, when RCAF 200 detects that a new UE is affected by congestion, it cannot determine whether the UE has moved in from another RCAF, or whether congestion has started at the UE's current location, or whether the UE has moved to a congested area, or whether the UE has been switched on at a congested area. For these reasons, there cannot be any handover procedure with context transfer from an old RCAF to a new RCAF.

Hence we can draw the following conclusions for mobility handling.

Conclusion 1: An RCAF 200 node cannot differentiate whether a UE that is no longer affected by congestion has moved to another RCAF or not.

Conclusion 2: When RCAF 200 indicates no congestion to the PCRF 100 for a given UE on the Np interface, this should be interpreted as no congestion experienced at the given RCAF which does not exclude that another RCAF may report that the same UE experiences congestion.

Conclusion 3: There cannot be any handover procedure from an old RCAF to a new RCAF involving context transfer.

The invention uses the principle that the RCAF 200 reports the changes in the congestion state such that it can avoid reporting the same state again and again. In this way, the signaling load can be reduced and a valid timer on the Np interface can be avoided.

Additionally, the concept of dynamic reporting policies or in other words reporting restrictions is possible. Such reporting restrictions can be defined on a per UE basis, and can control whether or not congestion reporting is enabled for a given UE; and which congestion levels should be reported when reporting is enabled. It is possible to avoid reporting certain congestion levels by defining one or more sets of congestion levels, such that the RCAF indicates only that the UE experiences a congestion level within the given set but does not indicate the congestion level itself. A set can typically contain a range of congestion levels. E.g., set#1={"no congestion", level 1 congestion}, and set#2={level 2 congestion, level 3 congestion}; and then the RCAF only indicates whether the UE experiences a congestion level in set#1 or set#2. (The sets must be non-overlapping such that a given congestion level can belong to a single set only.)

Such reporting restrictions can be realized by signaling from the PCRF 100 to the RCAF node 200 over the Np interface. In this way, an operator can avoid unnecessary signaling, e.g. in the case of a user with premium subscription which is not going to be subject to congestion mitigation rules; or similarly for machine type devices with small data for which there is no need to install mitigation rules due to low traffic.

In the following, the context of a mobile entity stored at RCAF 200 will be discussed. The UE, by entity context at the RCAF 200, refers to the data that needs to be stored at the RCAF 200 and is specific to a given UE. The following information may be included in the UE context at the RCAF 200.

To clarify the UE handling in the RCAF 200 the information that needs to be stored in the PCRF 100 is stored on a per UE basis.

The previously reported congestion level for a given UE. This needs to be stored so that the RCAF 200 can determine when a change has taken place in the congestion level. This enables delta reporting on the Np interface which reduces the signaling load.

The reporting restrictions discussed above received from the PCRF 100 are stored in the RCAF 200 on a per UE, per APN basis so that they can be subsequently applied on the Np interface. After the RCAF 200 has determined whether the congestion level for a given UE has changed, it checks the related reporting restrictions if they exist. The change in the congestion level is only indicated to the PCRF 100 if allowed by the reporting restrictions.

The UE context is kept in a given RCAF 200 only, and there is no context transfer between RCAFs. The context is created in the RCAF 200 when it is first determined in an RCAF 200 that a UE is affected by congestion, or when reporting restrictions are sent from the PCRF 100 removed in the RCAF 200 when explicitly indicated by the PCRF 100 using signaling on the Np interface. The context may also be removed from the RCAF 200 in case the UE has no reporting restrictions and the UE does not experience congestion this has already been reported to the PCRF 100.

Other information may also be included in the UE context at the RCAF 200.

In the following, different mobility scenarios of mobile entities are discussed in which the above-mentioned basic principles at the RCAF 200 or the PCRF 100 help to determine the correct mobility information.

In light of the conclusions 1, 2 and 3 above, the mobility handling on the Np interface has to work without any direct signaling and co-ordination between the old and new RCAF nodes 200. In most cases, UE mobility from an old RCAF to a new RCAF is solved automatically: when the UE becomes affected by congestion at a new RCAF, it triggers congestion reporting on Np for the given UE which automatically makes the PCRF 100 aware of the identity of the new RCAF. However, there can be problematic cases as follows.

Scenario 1. UE is affected by congestion at a first RCAF, named RCAF1 hereinafter and then moves to another RCAF, named RCAF2 hereinafter, where it is also affected by congestion. Consequently RCAF2 indicates the congestion situation to the PCRF. RCAF1 detects that the UE is no longer affected by congestion, and reports that fact to the PCRF. This information may arrive to the PCRF later than the reporting from RCAF2, since the timing of the signaling is not synchronized between RCAF1 and RCAF2. If the PCRF considers this later signaling from RCAF1, it would incorrectly consider the UE as not congested.

Scenario 2. UE is affected by congestion at RCAF1 and then moves to RCAF2 where it is also affected by congestion. Soon after that, the UE moves back to RCAF1 where it experiences the same level of congestion as before. Both RCAF1 and RCAF2 detect that the UE is affected by congestion. RCAF2 indicates the congestion to the PCRF which indicates the mobility to RCAF2. But RCAF1 does not signal to the PCRF because the congestion status at RCAF1 has not changed. This makes the PCRF incorrectly believe that the UE is located at RCAF2 and experiences the congestion level as reported by RCAF2, while in fact the UE has moved back to RCAF1 and experiences the congestion level as reported by RCAF1 earlier.

To solve these problematic scenarios, it is proposed to use explicit signaling from the PCRF 100 to release the UE context at the old RCAF. This avoids the problems due to having obsolete UE contexts stored at old RCAF nodes, and thereby avoids the problems with the above scenarios. The solution involves additional signaling during mobility; this is assumed to be acceptable, since mobility between RCAF nodes is expected to be rather infrequent.

In the proposed solution, the PCRF 100 and RCAF 200 observe the following rules. PCRF rules:

The PCRF 100 maintains the current RCAF 200 which has last indicated that the UE is affected by congestion.

When a new RCAF indicates that the UE is affected by congestion, the PCRF 100 sends a message to the old RCAF to explicitly release context at the old RCAF.

When the PCRF 100 receives a message from a new RCAF that does not indicate that the UE is affected by congestion, that message is not taken into account at PCRF 100. Such a message may be a message indicating the "no congestion" state for the UE, or a message indicating a set of congestion levels for the UE which includes the "no congestion" state in case reporting restrictions are used. When receiving such a message, the current RCAF remains unchanged; no release context message is sent to the old RCAF, and the PCRF 100 assumes the previous congestion status without updating it to no congestion state. However, the message may be acknowledged towards the RCAF.

When PCRF 100 removes its own UE context at IP-CAN session termination (e.g., UE is being detached), then PCRF explicitly signals to the current RCAF to releases context the UE context.

RCAF rules:

When indicated by PCRF signaling, an RCAF releases the UE context, including any dynamic reporting policy. This also implies that the RCAF does not indicate to the PCRF that the congestion state is over.

Note that if UE becomes affected by congestion again after the UE context has been released, the RCAF 200 reports change to congestion state to PCRF 100 as normally.

Figure 4:
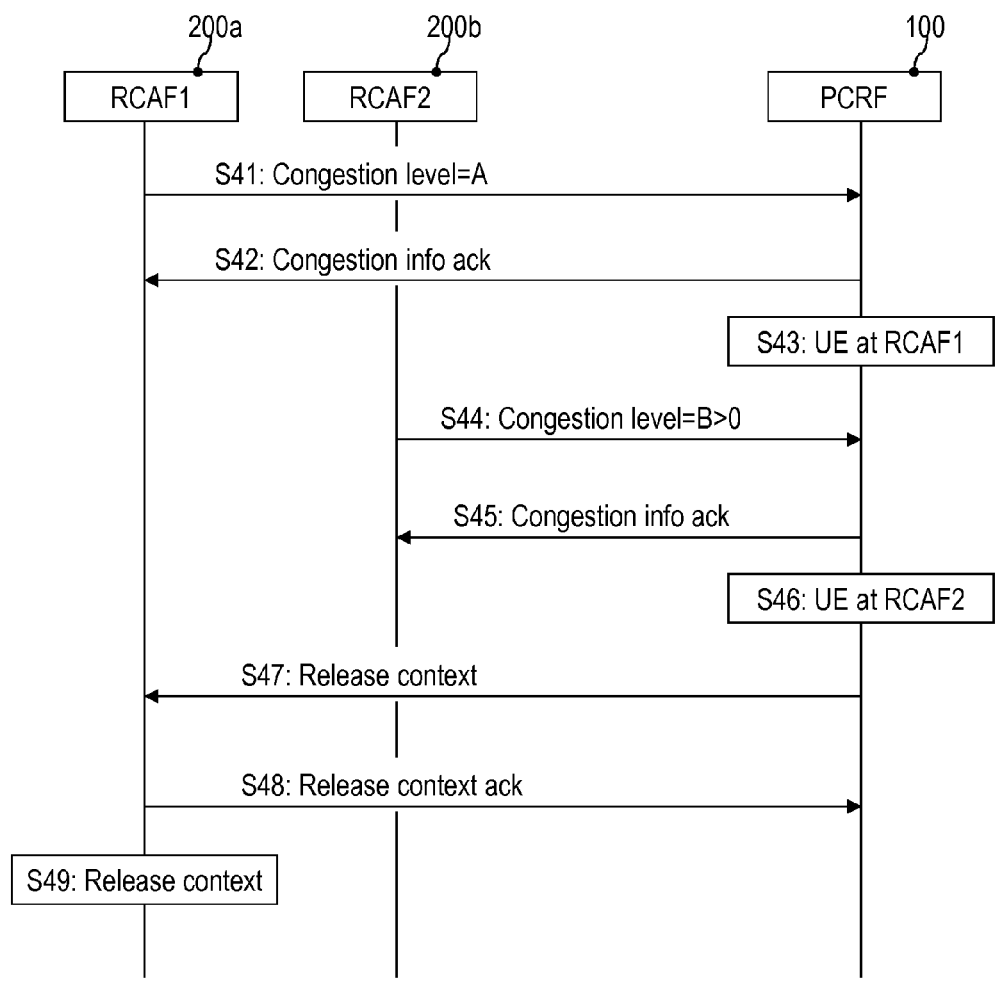
FIG. 4 shows a message exchange between a policy control unit and different congestion monitoring units which can effectively cope with the scenario in which a mobile entity moves from the coverage of one congestion monitoring unit to another congestion monitoring unit.

FIG. 4 shows an example of a mobility handling from a first RCAF, RCAF1 named hereinafter, to a second RCAF, named RCAF2 hereinafter. In FIG. 4 RCAF1 has the reference number 200*a* and RCAF2 has the reference number 200*b*. In step S41, RCAF1 200*a* report a congestion level A to the PCRF 100, the PCRF 100 acknowledging the congestion information to the RCAF1 200*a* in step S42. In step S43, the PCRF 100 stores the current RCAF, here RCAF1 200*a*, as the congestion monitoring unit which monitors the congestion state of the mobile entity in question. To this end, the PCRF 100 can have a database in which the different congestion monitoring units which currently report the congestion states per UE are stored. In step S44, a second RCAF 200*b* reports the congestion level, in step S45, the PCRF 100 acknowledging the received congestion information. In step S46, the new RCAF 200*b* then replaces the formerly stored RCAF1 200*a* in the database list (S46). The PCRF 100 then transmits a release message to the old RCAF1 200*a* which is acknowledged in step S48 and the context information is released in step S49 at the old RCAF1 200*a*.

Figure 5:
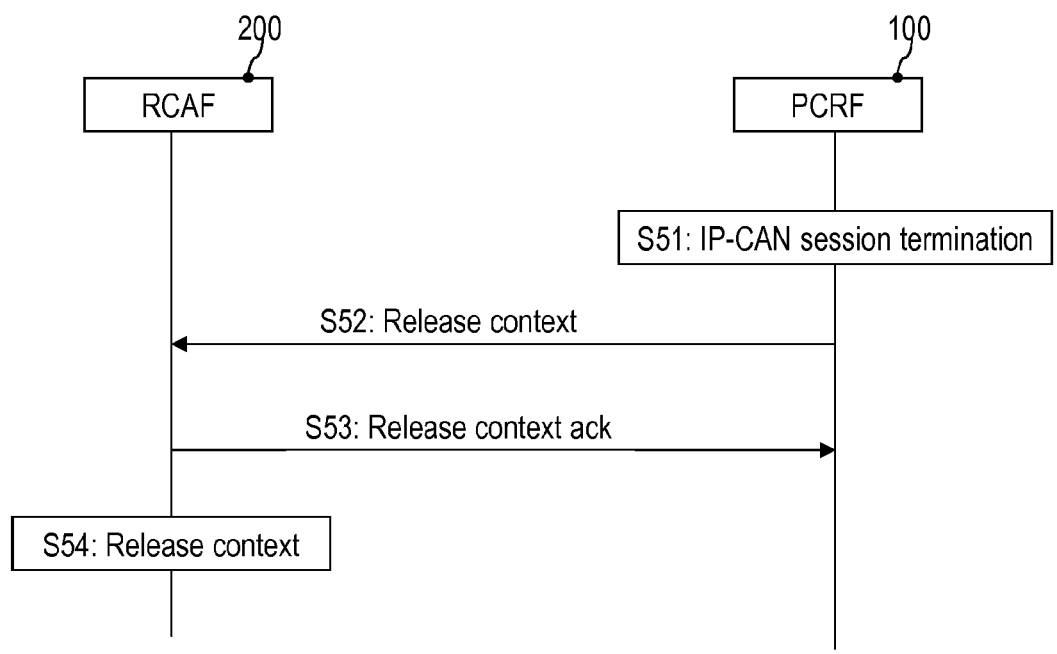
FIG. 5 shows a message exchange between a congestion monitoring unit and the policy control unit when the policy control unit determines that a data packet session of a mobile entity has terminated.

In FIG. 5, the embodiment is shown where the PCRF 100 determines that a data packet session of the UE ended. In step S51, the PCRF 100 determines the IP CAN session termination. In step S52, a release message is transmitted to the RCAF 200, the RCAF being the RCAF that is currently stored in the list at the PCRF 100. The RCAF 200 acknowledged the received message in step S53 and the context is released in step S54.

In the embodiment of FIG. 4, the release context message in step S47 ensures that the RCAF1 200*a* does not send any subsequent messages indicating a non-congested state at RCAF1 200*a*. It may happen that the RCAF1 200*a* still sends a message indicating no congestion state before it receives the release context message. However, such a non-congestion indication from RCAF1 200*a* is not taken into account at the PCRF 100 based on the above-mentioned rules.

In the case of FIG. 5, the release context message to the RCAF 200 ensures that the RCAF 200 signals to the PCRF 100 once again should the mobile entity move back to the RCAF 200 and is affected by congestion.

The use of the release context messages also makes sure that possible reporting restrictions which are stored as part of the release context in the RCAF cannot become obsolete. This is ensured because each time the UE moves to a RCAF and terminates its session, the old reporting restriction is removed.

Figure 2:
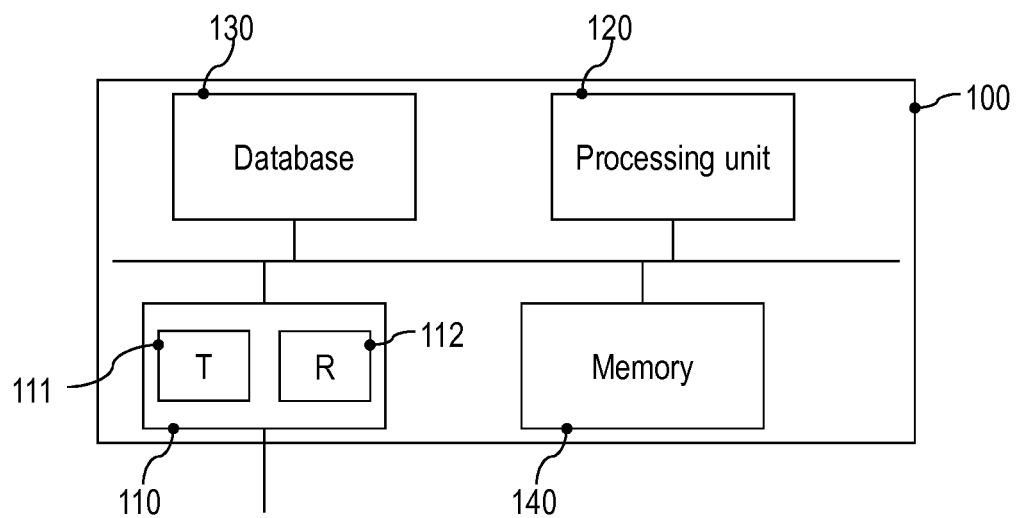
FIG. 2 is a schematic block diagram of a policy control unit shown in FIG. 1.
Figure 3:
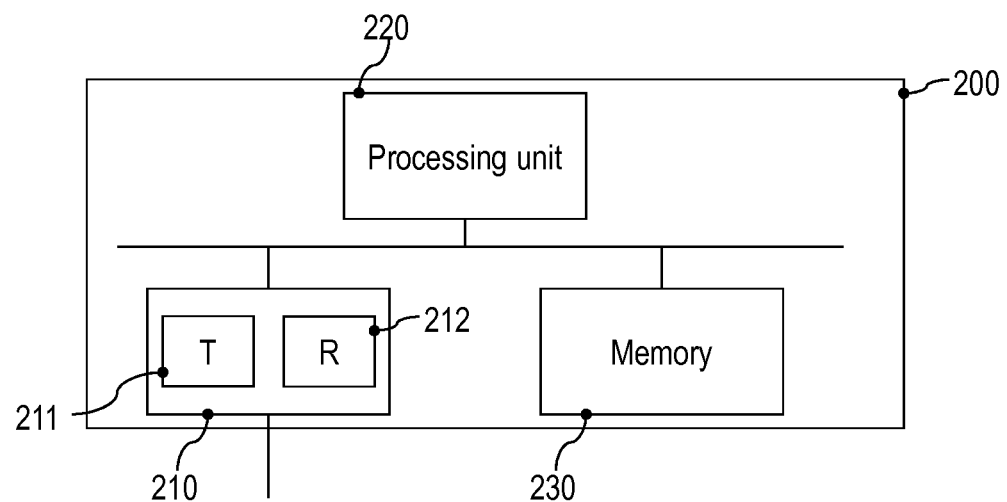
FIG. 3 is a schematic block diagram of a congestion monitoring unit incorporating features of the invention and shown in FIG. 1.

FIGS. 2 and 3 illustrate exemplary structures of a PCRF 100 or an RCAF 200. Making reference especially to FIG. 2, the PCRF 100 contains an input/output unit 110 with a transmitter 111 and a receiver 112. The transmitter 111 symbolizes the possibility of the PCRF 100 to transmit data to other entities, the receiver 113 receiving data from other entities. The input/output unit 110 is used for communication with any of the other entities such as the RCAF 200, PDN gateway 40, the TDF 50 or the PDN 60. The PCRF 100 comprises a database 130 in which the information can be stored which RCAF is reporting congestion states for which mobile entity. As discussed above, the PCRF 100 stores the current congestion monitoring unit or RCAF and if a congested state is received from another RCAF, the currently stored RCAF is replaced by the new RCAF that reported a congested state. However, as discussed above the RCAF is only stored when the new RCAF reports a congested state and not a non-congested state. A processing unit 120 is provided comprising one or more processors which is responsible for the operation of the PCRF 100. The processing unit can generate the commands that are needed to carry out the above discussed procedures in which the PCRF 100 is involved. A memory 140 is provided which may be a read-only memory, a flash read-only memory, a random access memory, a mass storage, a hard disk or the like. The memory 140 includes suitable program codes to be executed by the processing unit 120 so as to implement the above-described functionalities.

In the same way, the RCAF 200 shown in FIG. 3 comprises an input/output unit 210 for communicating with other entities, inter alia the entities shown in FIG. 1, the input output unit comprising a transmitter 211 and a receiver 212. The transmitter 211 is used for the transmission of data to other entities, the receiver being used to receive data from other entities. A processing unit 220 including one or more processors is provided which is used for the operation of the RCAF 200. The processing unit 220 is adapted to initiate the functions discussed above in which the RCAF 200 is involved. A memory 230 is provided which can be read-only memory, a flash read-only memory, a random access memory, a mass storage, a hard disk or the like and the memory 230 includes a suitable program code to be executed by the processing unit 220 so as to implement the above-described functionalities. The memory may furthermore store, on a per UE base reporting restrictions as discussed in more detail below.

It should be understood that the structures shown in FIGS. 2 and 3 are merely schematic and that the PCRF 100 or the RCAF 200 may actually include further components which for the sake of clarity have not been illustrated.

It should also be understood that the different entities shown in FIGS. 2 and 3 need not be incorporated by several entities. Furthermore, the different entities shown in FIGS. 2 and 3 may be incorporated by hardware or software or a combination of hardware and software.

Figure 6:
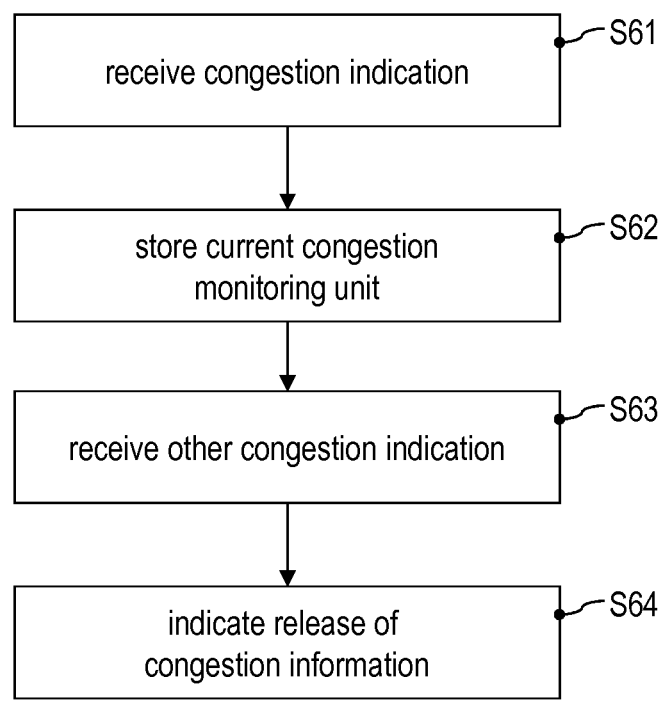
FIG. 6 shows a flowchart including the steps carried out at a policy control unit to handle congestion information when the mobile entity has moved from the control of one congestion monitoring unit to the control of another congestion monitoring unit.

FIG. 6 summarizes some of the steps carried out at PCRF 100. In step S61, a congestion information is received from one of the RCAF and in step S62, the RCAF from which the congestion information or indication is received is stored as the current congestion monitoring unit/RCAF. If in step S63 a congestion information is received from another RCAF 200, the currently stored congestion monitoring unit/RCAF is informed to release congestion information relating to the mobile entity in question.

Figure 7:
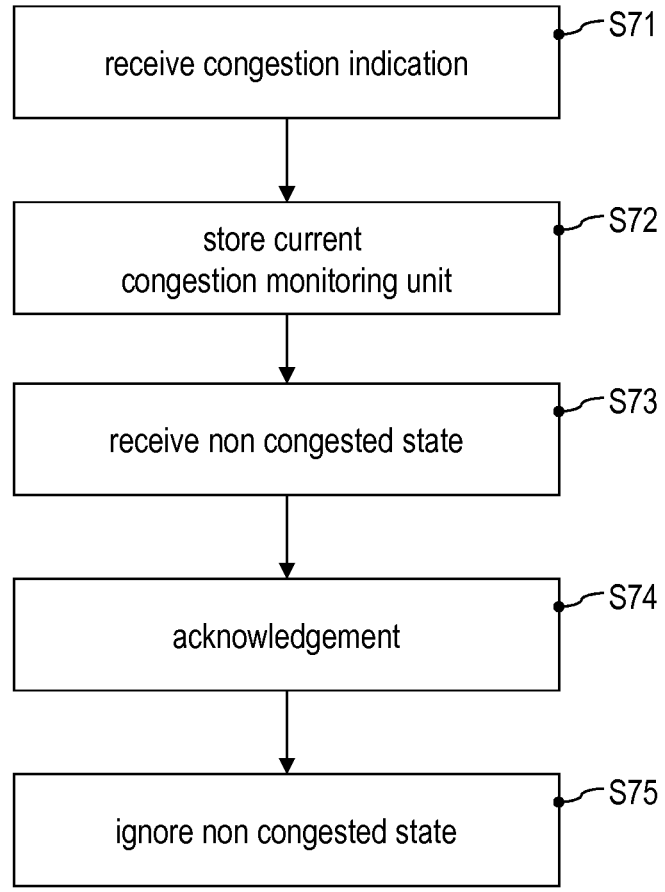
FIG. 7 shows a flowchart comprising the steps carried out at the policy control unit when one of the congestion monitoring units provides the information that a mobile entity is in a non-congested state.

In FIG. 7, another embodiment is shown where the PCRF first receives information about a congested state and then receives information about a non-congested state. In step S71 and S72, information about a congested state is received from one of the RCAFs 200 and the RCAF from which the information is received is stored as it was discussed above in connection with steps S61 and S62.

In step S73, the PCRF now receives an indication of a non-congested state by another RCAF. The PCRF can acknowledge this message to the RCAF for which the information about the non-congested state is received (step S74) but the PCRF ignores this information and does not amend the currently stored congestion monitoring unit (at step S75).

Figure 8:
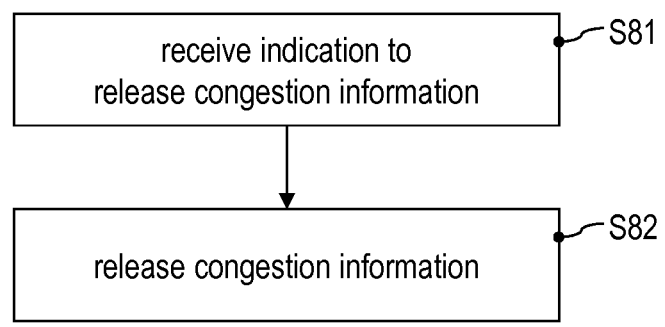
FIG. 8 shows a flowchart including the steps carried out at the congestion monitoring unit when receiving a message to release congestion information of a mobile entity.

FIG. 8 summarizes steps carried out at the RCAF 200. When an RCAF receives an indication to release a congestion information or context mobile entity in step S81, the congestion information or context is release in step S82 as instructed by the PCRF.

In the following, a possibility to release a context is described in more detail.

It is possible to avoid the Release context message from the PCRF 100 to the RCAF 200 in case the last reported congestion level is "no congestion" and the PCRF 100 has not installed any reporting restrictions into the RCAF 200. This is because in this case, there is no risk with an obsolete UE context at the RCAF 200, since the UE context would be "empty" for such a UE. Hence, in this case, the RCAF 200 can release the UE context on its own based on a timer.

However, for this optimization the PCRF 100 needs to use a guard timer to avoid mobility back to the original RCAF 200 for a short period of time. That is needed to handle cases when the UE has become affected by congestion at the old RCAF just before moving to a new RCAF. In that case the PCRF 100 could receive a congestion indication from the old RCAF as well. In this optimization, such a congestion indication needs to be responded by a Release context message In the following, a situation is discussed where the network comprises several PCRFs 100.

It is possible for a UE to be connected to multiple PDNs (Packet Data Networks) identified by different APNs (Access Point Name). In that case, the PCRF 100 corresponding to these different PDN connections (PDP contexts) can be different.

Such multiple PCRF case can be simply handled in such a way that each Np connection to a PCRF 100 is handled independently. The Np mobility approach presented above applies for each Np connection to a PCRF 100. The UE context in the RCAF 200 in this case can be handled separately for each Np connection. A Release context message from a PCRF applies to the UE context specific to the given Np connection only.

As an optimization, it is possible to realize an embodiment with combined handling in a way that a release context message from one PCRF 100 also releases the context corresponding to all other Np connections to other PCRFs. Such optimization could make it faster to release the full context in the RCAF 200.

In the following, a situation is discussed where a mobile entity frequently moves from one area covered by one RCAF to another area covered by another RCAF.

In case of a UE which is located at the borderline between the area of two RCAFs, it may happen that there is frequent mobility between RCAF1 and RCAF2 as a UE moves back and forth between their areas. This may happen e.g., when RCAF1 and RCAF2 correspond to different RATs (one is e.g. for 3G, the other is for LTE), and the UE is moving around the border of the coverage area of one of the RATs. In this case, the solution may lead to frequent signaling due to the frequent context release at the old RCAF.

When the PCRF detects frequent mobility for a given UE, it is possible to send an indication to the RCAF to use a longer reporting period in order to reduce the signaling. Such indication can be sent to the current RCAF (and after mobility, to the other RCAF which becomes current). Even though this leads to lower accuracy in the PCRF, such an approach can limit the signaling load.

The indications or messages described above that are exchanged between the PCRF 100 and the RCAF 200 an be incorporated as a single message. However, the indication can also be incorporated into another message.

Summarizing, the above-described invention allows a reduction of the signaling between a RCAF 200 and PCRF 100 due to the fact that only changes in the congestion state are reported. Furthermore, the invention can be used to provide an accurate information in the PCRF since changes in the congestion state are reported without waiting for a validity timer to expire. The invention furthermore can be used to guarantee that even during UE mobility, the information in the PCRF 100 will be consistent with the congestion situation experienced by the UE. Furthermore, the invention can be used to guarantee that any obsolete context information stored in a RCAF is removed.

The invention claimed is:

1. A method, by a policy control unit of a mobile communications network, to control a signaling of congestion information of mobile entities at a plurality of congestion monitoring units that monitor which mobile entities are affected by a congestion state in a radio access network of the mobile communications network, the method comprising:
   receiving, from one of the congestion monitoring units, an indication that one of the mobile entities is affected by a congestion state;
   storing said one congestion monitoring unit from which the indication is received as the current congestion monitoring unit for said one mobile entity;
   receiving, from another congestion monitoring unit, the indication that said one mobile entity is affected by a congestion state; and
   indicating, in response to the indication received from the other monitoring unit, to the current congestion monitoring unit a release of congestion information relating to said one mobile entity.

2. The method of claim 1 wherein, when a second indication is received from any of the plurality of congestion monitoring units that said one mobile entity is not affected by a congestion state, the second indication is ignored and no indication is sent to the current congestion monitoring unit to release congestion information.

3. The method of claim 2, wherein the stored current congestion monitoring unit is kept as the current congestion monitoring unit when the second indication is received from any of the plurality of the congestion monitoring units.

4. The method of claim 2, wherein an acknowledgement is transmitted as a response to the congestion monitoring unit which transmitted the second indication.

5. The method of claim 1, wherein the other congestion monitoring unit is stored as the current congestion monitoring unit when said other congestion monitoring unit has indicated that said one mobile entity is affected by a congestion state.

6. The method of claim 1, wherein, when a termination of a data packet session of the said one mobile entity is detected, it is indicated to the current congestion monitoring unit to release congestion information relating to said mobile entity.

7. The method of claim 1, wherein indicating a release of congestion information comprises information to release a context for said one mobile entity.

8. The method of claim 1, further comprising informing the plurality of congestion monitoring units whether or not a monitoring of the congestion state should be carried out for said one mobile entity.

9. The method of claim 8, wherein, if the monitoring of the congestion state should be carried out, the plurality of congestion monitoring units are informed that the congestion state should only be reported to the policy control unit when the congestion state has reached a predefined level or a predefined level range.

10. A policy control unit configured to control a signaling of congestion information of mobile entities at a plurality of congestion monitoring units that monitor which mobile entities are affected by a congestion state in a radio access network of the mobile communications network, the policy control unit comprising:
    a receiver configured to receive, from one of the congestion monitoring units, a first indication that one of the mobile entities is affected by a congestion state;
    a database configured to store said one congestion monitoring unit from which the first indication is received as the current congestion monitoring unit for said one mobile entity;
    a transmitter; and
    a processing circuit;
    wherein the processing circuit is configured to use the transmitter to indicate to the current congestion monitoring unit to release congestion information relating to said one mobile entity in response to the received first indication, when the receiver receives the first indication that said one mobile entity is affected by a congestion state from another congestion monitoring unit.

11. The policy control unit of claim 10, wherein the policy control unit is a Policy and Charging Rules Function (PCRF).

12. A method to operate a congestion monitoring unit that monitors which mobile entities are affected by a congestion state in a radio access network of a mobile communications network, the method comprising:
    sending, to a policy control unit of the mobile communications network, an indication that one of the mobile entities is affected by a congestion state;
    receiving, from the policy control unit of the mobile communications network, an indication to release congestion information relating to said one mobile entity; and
    releasing the congestion information for said one mobile entity in response to the received indication.

13. The method of claim 12, further receiving mobile entity dependent information whether a monitoring of the congestion state should be carried out for the corresponding mobile entity or not, wherein a monitoring of a congestion state is only carried out for one of the mobile entities if the corresponding mobile entity dependent information states that the monitoring of the congestion state should be carried out.

14. The method of claim 13, wherein the mobile entity dependent information contains the information that a congested state is present for one mobile entity when the congestion state has reached a predefined level or a predefined level range, wherein the indication that said one mobile entity is affected by a congestion state is only transmitted to the policy control unit when the congestion state has reached the predefined level or level range.

15. A congestion monitoring unit configured to monitor which mobile entities are affected by a congestion state in a radio access network of a mobile communications network, the congestion monitoring unit comprising:

a transmitter configured to send, to a policy control unit of the mobile communications network, an indication that one of the mobile entities is affected by a congestion state, a receiver configured to receive, from the policy control unit of the mobile communications network, an indication to release congestion information relating to said one mobile entity, and a processing circuit configured to release the congestion information for said one mobile entity in response to the received indication.

16. The congestion monitoring unit of claim 15, wherein the congestion monitoring unit is a Radio Access Network Congestion Awareness Function (RCAF).

17. A non-transitory computer-readable medium comprising, stored thereupon, a computer program comprising instructions that, when executed by at least one processing circuit in a policy control unit of a mobile communications network, cause the at least one processing circuit to control a signaling of congestion information of mobile entities at a plurality of congestion monitoring units that monitor which mobile entities are affected by a congestion state in a radio access network of the mobile communications network by:

receiving, from one of the congestion monitoring units, an indication that one of the mobile entities is affected by a congestion state;

storing said one congestion monitoring unit from which the indication is received as the current congestion monitoring unit for said one mobile entity;

receiving, from another congestion monitoring unit, the indication that said one mobile entity is affected by a congestion state; and indicating, in response to the indication received from the other monitoring unit, to the current congestion monitoring unit a release of congestion information relating to said one mobile entity.

18. A non-transitory computer-readable medium comprising, stored thereupon, a computer program comprising instructions that, when executed by at least one processing circuit in a congestion monitoring unit that monitors which mobile entities are affected by a congestion state in a radio access network of a mobile communications network, cause the at least one processing circuit to:

send, to a policy control unit of the mobile communications network, an indication that one of the mobile entities is affected by a congestion state;

receive from the policy control unit of the mobile communications network, an indication to release congestion information relating to said one mobile entity; and release the congestion information for said one mobile entity in response to the received indication.

* * * * *